(12) United States Patent
Guan

(10) Patent No.: US 7,778,537 B2
(45) Date of Patent: Aug. 17, 2010

(54) ZOOMING SYSTEM AND METHOD

(75) Inventor: Qi-Da Guan, Foshan (CN)

(73) Assignees: Premier Image Technology (China) Ltd., Foshan, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 207 days.

(21) Appl. No.: 12/102,641

(22) Filed: Apr. 14, 2008

(65) Prior Publication Data

US 2009/0141367 A1 Jun. 4, 2009

(30) Foreign Application Priority Data

Dec. 3, 2007 (CN) .................. 2007 1 0202826

(51) Int. Cl.
| | |
|---|---|
| G03B 17/00 | (2006.01) |
| G03B 13/00 | (2006.01) |
| H04N 5/262 | (2006.01) |
| H04N 5/232 | (2006.01) |
| G06K 9/00 | (2006.01) |
| G06K 9/36 | (2006.01) |

(52) U.S. Cl. .......... 396/60; 396/77; 348/240.2; 348/348; 382/118; 382/291

(58) Field of Classification Search .......... 396/77, 396/60

See application file for complete search history.

(56) References Cited

U.S. PATENT DOCUMENTS

| 5,835,641 A * | 11/1998 | Sotoda et al. .......... 382/291 |
| 2004/0119852 A1 * | 6/2004 | Shin .......... 348/240.2 |

\* cited by examiner

*Primary Examiner*—Melissa J Koval
(74) *Attorney, Agent, or Firm*—Andrew C. Cheng

(57) ABSTRACT

A zooming system includes a selecting unit, a detection unit, a calculating unit, a controlling unit, and a zooming unit. The selecting unit is configured for selecting a zoom mode based on the presence of faces in a pre-image. The detection unit is configured for detecting facial areas in the pre-image. The calculating unit is configured for calculating a zoom ratio on the basis of a dimensional ratio of the detected facial areas to the pre-image. The zooming unit is controlled by the controlling unit to zoom the imaging device according to the zoom ratio.

6 Claims, 2 Drawing Sheets

ZOOMING SYSTEM AND METHOD

BACKGROUND

1. Technical Field

The present invention relates to imaging technology, and particularly to a zooming system and method.

2. Description of Related Art

Imaging devices, such as digital still cameras, mobile phones with imaging functions etc., are popularly used nowadays by families for capturing face images in different scenes. However, most people are not professionally skilled in photography. It is not easy for them to achieve images with a proper proportion between facial areas and backgrounds.

What is needed, therefore, is a zooming system and method to achieve images with a proper proportion between facial areas and backgrounds.

SUMMARY

In accordance with a present embodiment, a zooming system includes a selecting unit, a detection unit, a calculating unit, a controlling unit, and a zooming unit. The selecting unit is configured for selecting a zoom mode based on the presence of faces in a pre-image. The detection unit is configured for detecting facial areas in the pre-image. The calculating unit is configured for calculating a zoom ratio on the basis of a dimensional ratio of the detected facial areas to the pre-image. The zooming unit is controlled by the controlling unit to zoom the imaging device according to the zoom ratio.

Other advantages and novel features will be drawn from the following detailed description of at least one preferred embodiment, when considered in conjunction with the attached drawings.

BRIEF DESCRIPTION OF THE DRAWINGS

Many aspects of the present zooming system and method can be better understood with reference to the following drawings. The components in the drawings are not necessarily drawn to scale, the emphasis instead being placed upon clearly illustrating the principles of the present zooming system and method. Moreover, in the drawings, like reference numerals designate corresponding parts throughout the several views.

DETAILED DESCRIPTION OF THE EMBODIMENTS

Embodiments of the present zooming system and method will now be described in detail below with reference to the drawings.

Figure 1:
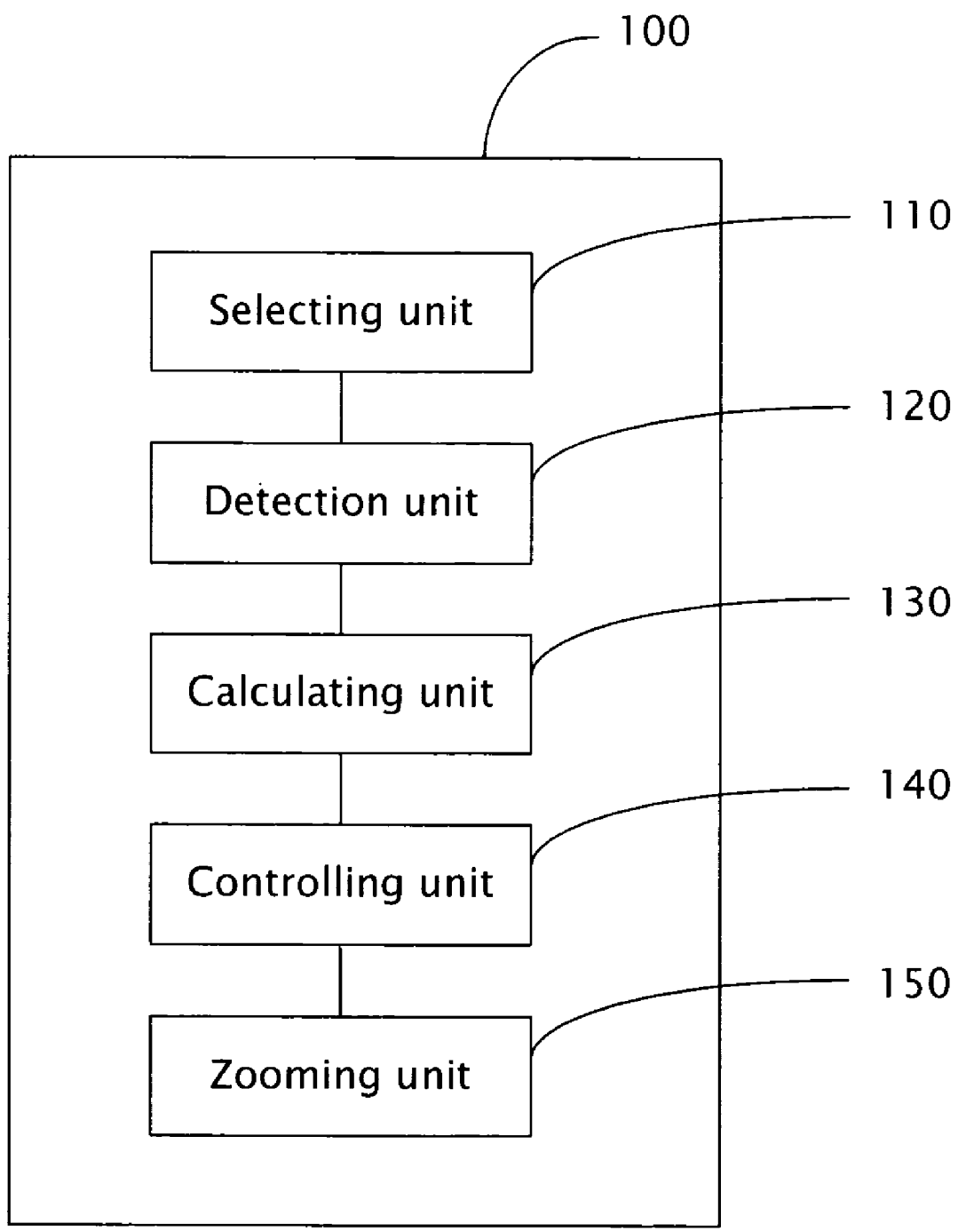
FIG. 1 is a functional diagram of a zooming system, according to an exemplary embodiment.

Referring to FIG. 1, a zooming system 100 according to an exemplary embodiment comprises a selecting unit 110, a detection unit 120, a calculating unit 130, a controlling unit 140, and a zooming unit 150.

The selecting unit 110 is configured for selecting a zoom mode from general and special zoom modes of an imaging device, based on whether face(s) are present in a pre-image or not. The selecting unit 110 can be a panel-touch key, a keypad input key, or the like of the imaging device. If no face is present in the pre-image, the general zoom mode is selected. In the general zoom mode, the zoom ratio of the imaging device can be set by any conventional way. If one or more faces are present in the pre-image, the special zoom mode is selected. In the special zoom mode, the zoom ratio of the imaging device can be set according to a dimensional ratio (explained in detail hereafter) of the facial area(s) to the pre-image in which the facial area(s) is located.

The detection unit 120 is configured for detecting facial area(s) in the pre-image, i.e. for finding the face(s) in the pre-image, when the special zoom mode is selected in the imaging device. Any of many detection algorithms including neural network, statistical approaches, linear subspace methods, RGB normalized color, feature searching, constellation analysis, generalized measure, fuzzy color, or algorithm template, can be used by the detection unit 120.

The calculating unit 130 is configured for calculating the dimensional ratio of the detected facial area(s) to the pre-image. The calculating unit 130 measures a first distance between a left extremity of a left facial area and a right extremity of a right facial area, and a second distance between left and right extremities of the pre-image, and calculates a proportion of the first distance to the second distance to achieve the dimensional ratio. The calculating unit 130 calculates a zoom ratio on the basis of the dimensional ratio following a certain mathematical formula, such as $R_z=R_d/K$, wherein $R_z$ is the zoom ratio, $R_d$ is the dimensional ratio, and K is a proportional coefficient.

The controlling unit 140 is configured for controlling the zooming unit 150 to automatically zoom the imaging device, according to the calculated zoom ratio. When the zooming unit 150 is located at a position corresponding to the calculated zoom ratio, the imaging device can produce a final image with a proper proportion between the facial area(s) and the background.

Figure 2:
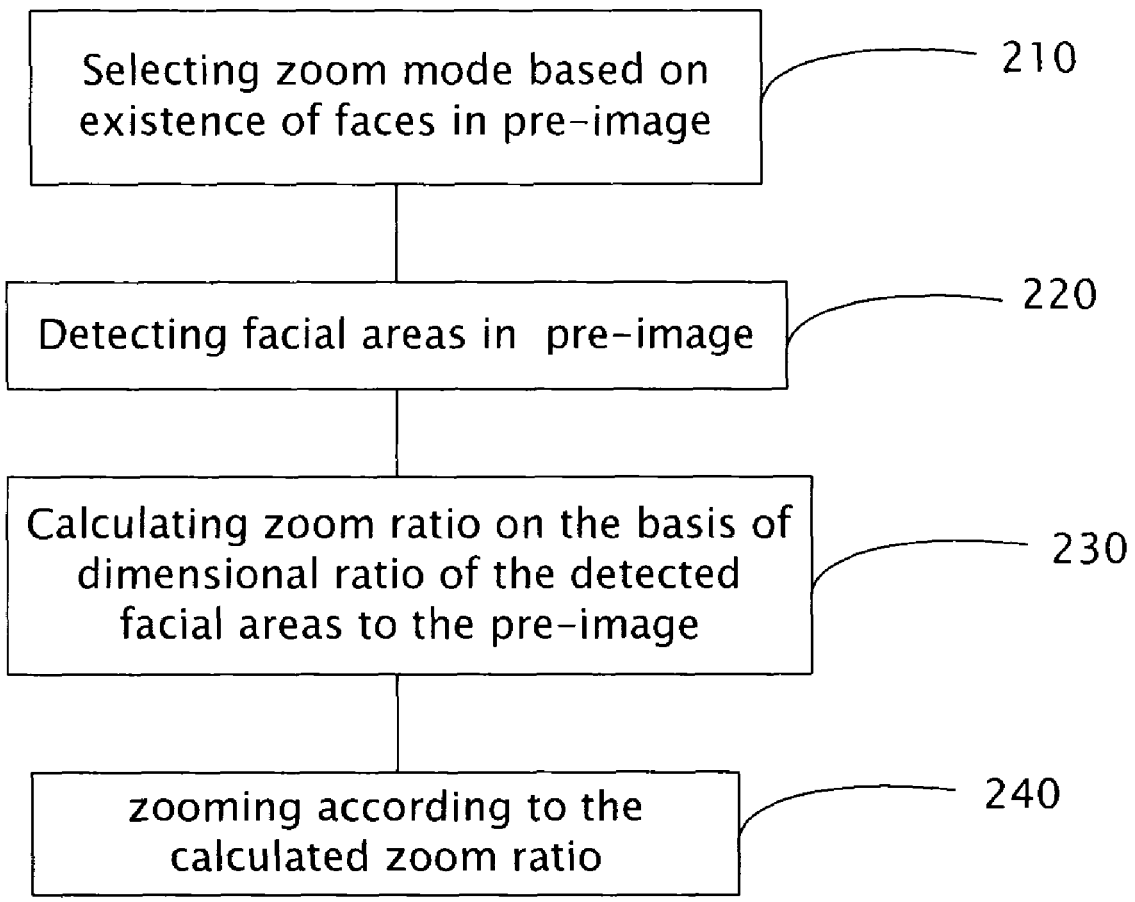
FIG. 2 is a flow chart of a zooming method which can be performed by the system of FIG. 1.

Referring to FIG. 2, a zooming method according to the exemplary embodiment can be performed by, for example, the zooming system 100, and includes the following operations 210~240.

Operation 210: selecting a zoom mode from general and special zoom mode of an imaging device, based on whether face(s) are present in a pre-image or not. This operation can be carried out by the selecting unit 110, such as a keypad input key, a panel-touch key, or the like of the imaging device. If no faces are present in the pre-image, the general zoom mode is selected. In the general zoom mode, the zoom ratio of the imaging device can be set by any conventional way. If one or more faces are present in the pre-image, the special zoom mode is selected. In the special zoom mode, the zoom ratio of the imaging device can be set according to a dimensional ratio of facial area(s) to the pre-image in which the facial area(s) is located.

Operation 220: detecting facial area(s) in the pre-image, i.e., finding face(s) in the pre-image when the special zoom mode is selected in the imaging device. The operation can be carried out by the detection unit 120. Any one of many detection algorithms including neural network, statistical approaches, linear subspace methods, RGB normalized color, feature searching, constellation analysis, generalized measure, fuzzy color, or algorithm template, can be used for this operation.

Operation 230: calculating zoom ratio of the imaging device. This operation can be carried out by the calculating unit 130. A distance between a left extremity of a left facial area and a right extremity of a right facial area which is designated as a first distance, and a distance between left and right extremities of the pre-image which is designated as a second distance, are measured in this operation by the calculating unit 130. The zoom ratio is based on a dimensional ratio, i.e., a proportion of the first distance to the second distance, following a certain formula, such as $R_z=R_d/K$, wherein $R_z$ is the zoom ratio, $R_d$ is the dimensional ratio, and K is a proportional coefficient.

Operation 240: zooming according to the calculated zoom ratio. This operation can be carried out by the controlling unit 140 cooperating with the zooming unit 150. The controlling unit 140 controls the zooming unit 150 to automatically zoom the imaging device, according to the calculated zoom ratio. When the zooming unit 150 is located at a position corresponding to the calculated zoom ratio, the imaging device can produce a final image with a proper proportion between the facial area(s) and the background.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A zooming system comprising:
   a selecting unit configured for selecting a zoom mode based on a presence of faces in a pre-image;
   a detection unit configured for detecting facial areas in the pre-image;
   a calculating unit configured for calculating a zoom ratio on the basis of a dimensional ratio of a first distance between a left extremity of a left facial area and a right extremity of a right facial area, to a second distance between left and right extremities of the pre-image;
   a controlling unit; and
   a zooming unit controlled by the controlling unit to zoom the imaging device according to the zoom ratio.

2. The zooming system as claimed in claim 1, wherein the dimensional ratio is a proportion of the first distance to the second distance.

3. The zooming system as claimed in claim 1, wherein the zoom ratio and the dimensional ratio follows a formula Rz=Rd/K, wherein Rz is the zoom ratio, Rd is the dimensional ratio, and K is a proportional coefficient.

4. A zooming method comprising:
   selecting a zoom mode based on a presence of faces in a pre-image;
   detecting facial areas in the pre-image;
   calculating zoom ratio on the basis of a dimensional ratio of a first distance between a left extremity of a left facial area and a right extremity of a right facial area, to a second distance between left and right extremities of the pre-image; and
   zooming according to the calculated zoom ratio.

5. The zooming method as claimed in claim 4, wherein the dimensional ratio is a proportion of the first distance to the second distance.

6. The zooming method as claimed in claim 4, wherein the zoom ratio and the dimensional ratio follows a formula Rz=Rd/K, wherein Rz is the zoom ratio, Rd is the dimensional ratio, and K is a proportional coefficient.

* * * * *